July 6, 1926.
J. WEGNER
1,591,195
SUPPLEMENTARY TURNTABLE AND CLAMPING FRAME
Original Filed Sept. 12, 1924   2 Sheets-Sheet 1
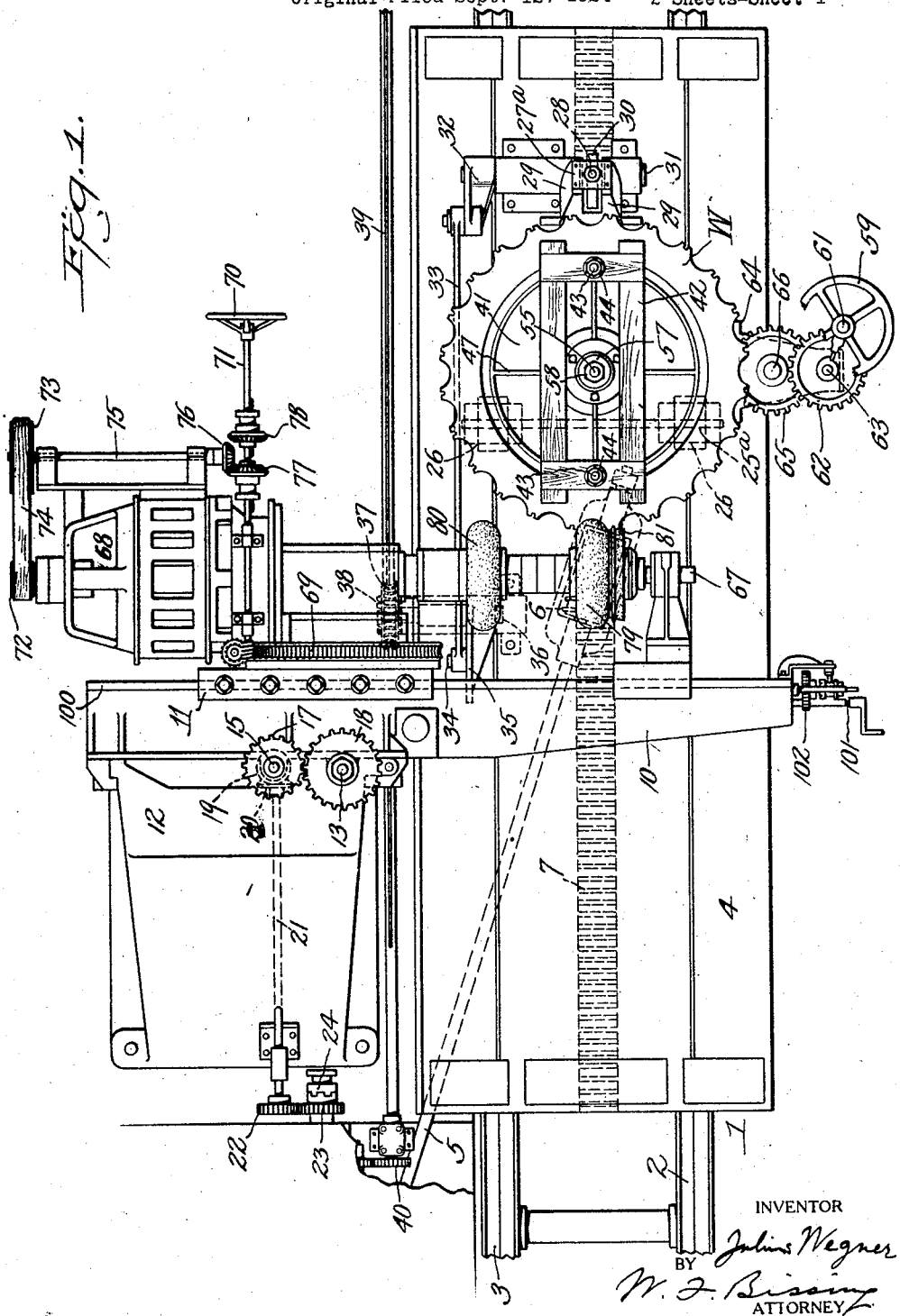
INVENTOR
Julius Wegner
BY
ATTORNEY July 6, 1926.
J. WEGNER
1,591,195
SUPPLEMENTARY TURNTABLE AND CLAMPING FRAME
Original Filed Sept. 12, 1924    2 Sheets-Sheet 2
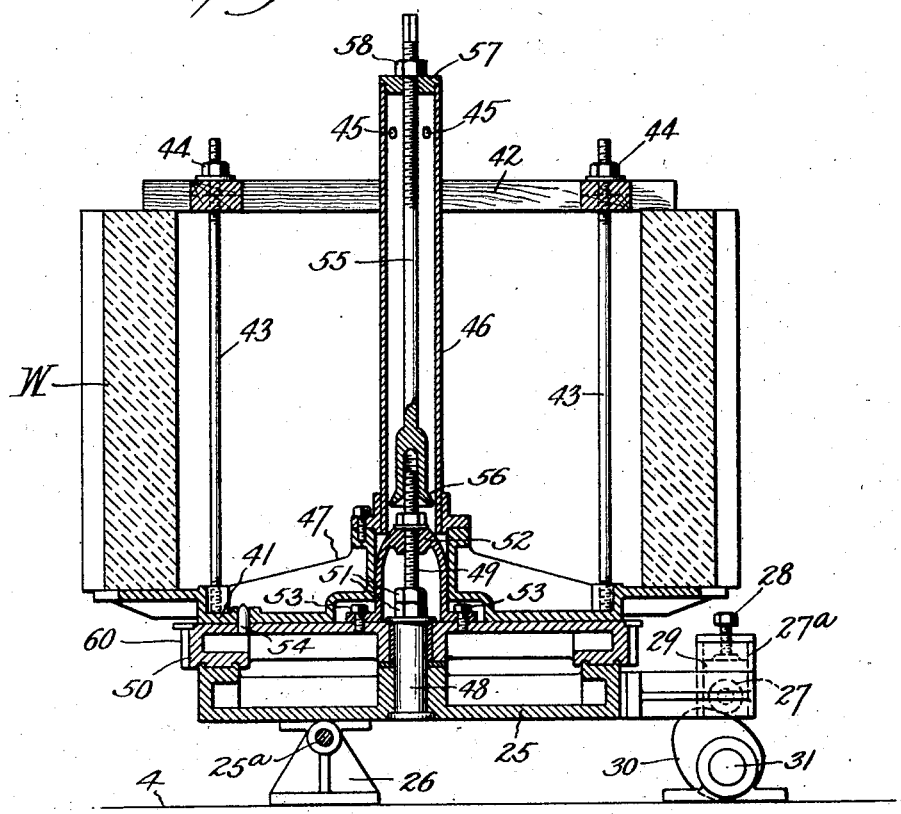
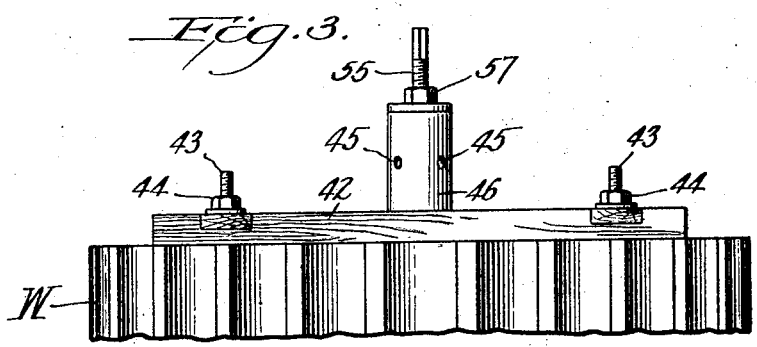

Patented July 6, 1926.

1,591,195

UNITED STATES PATENT OFFICE.

JULIUS WEGNER, OF NEW YORK, N. Y.

SUPPLEMENTARY TURNTABLE AND CLAMPING FRAME.

Original application filed September 12, 1924, Serial No. 737,291. Divided and this application filed September 16, 1925. Serial No. 56,584.

This invention relates to a turntable for a machine for working marble, stone and the like in which the turntable for the work is supported on a reciprocating table and the grinder or cutting head is carried above it, there being a relative feed between the work and the grinder or cutting head. This application is a division of my companion application Serial No. 737,291, filed September 12, 1924.

One of the objects of the invention is to provide a supplementary turntable and clamping frame for preliminarily setting up the work and for clamping it to and unclamping it from the table of the machine, the work being first preliminarily clamped to the frame and then hoisted and transferred to the turntable of the machine.

With the above and other objects in view, my invention consists in the parts, improvements and combinations more fully pointed out hereinafter.

Referring now to the drawings, which illustrate one embodiment of the invention:

Figure 1, is a plan view of the grinding machine, looking down upon the turntable.

Figure 2, is a view, largely in section, showing the supplementary turntable, and Figure 3, is a detail side elevation, showing the top of the clamping frame when clamped upon the work.

Before describing the turntable and clamping frame, I will describe the marble working machine with which the invention is used.

In the drawings, the frame of the machine is indicated at 1, the frame being provided with a pair of rails or tracks, 2, 3, on which the table 4, reciprocates. A shaft 5, is used to reciprocate the table, the shaft 5, carrying on its outer end the worm 6. Worm 6 engages a rack 7, secured to the bottom of the table and running lengthwise thereof. As the shaft 5, is rotated and reversed the worm engaging the rack will reciprocate the table. Means, not shown, see my companion application Serial No. 737,291, are provided for driving the shaft 5, by power or adjusting it by hand.

A crossrail member 10, is provided which carries a crossrail, over and across which the carriage 11, carrying the rotary grinding head, is shifted. The crossrail member 10, may be raised and lowered by power or by hand and is carried by a standard 12, at one side of the machine frame. A hoisting screw 13, rotatably mounted in the standard 12, is provided for raising and lowering the crossrail, the screw 13, engaging the threaded sleeve fixed to the back of the crossrail. A shaft 15, extends parallel to the screw 13, the shaft 15, carrying gear 17. Gear 17, is in mesh with gear 18, on hoisting screw 13. On turning shaft 15, screw 13, will thus be rotated.

The shaft 15, may be turned by power or by hand and for this purpose, the shaft 15, carries at its bottom a bevel gear 19, which meshes with a bevel gear 20, the latter carried by shaft 21. Shaft 21, may be suitably driven thru gears 22, 23, the latter being clutchable to a power shaft, not shown, by clutch 24. The driving of shaft 21, will in turn rotate hoisting screw 13, in one direction or the other thus raising and lowering the crossrail member.

The grinder carriage 11, may be shifted back and forth on crossrails, the upper crossrail being shown at 100. A hand operated shaft 101, is mounted in one end of the crossrail member 10. This shaft carries a gear 102, which engages other gearing and clutch connections, not shown, so, when desired, the squared end of shaft 101, may be turned by a hand crank and the carriage 11, then shifted in either direction.

The turntable and work may be automatically rocked or tilted so as to produce a swell or diminish in the desired column sections, simultaneously with and proportional to the vertical feed of the crossrail carrying the grinder carriage. The carrier plate 25, is pivoted at 25ª, upon brackets 26, carried by the table 4. At the far end of the carrier plate, a cam roller 27, is mounted in an adjustable box 27ª, which can be vertically adjusted by set screw 28, the box sliding in bracket 29, secured to the carrier plate. A cam 30, carried by shaft 31, carried in brackets supported by the table 4, is rocked by suitable means. The cam shaft 31, carries crank 32, which is adjustably connected by link 33, and crank pin 34 to rock arm 35. Rock arm 35, is secured to shaft 36, which carries a worm wheel 37, and is driven by worm 38, slidably engaging the spline on shaft 39. Shaft 39, may be driven by suitable means thru gear 40 on shaft 39, and thru other gearing and clutch connections, not shown. Means, not shown, are also provided by which the shaft 39, for rocking the carrier plate and the shaft 21, for raising the cross-member carrying the cutter carriage, may be simultaneously operated so as to give a swell or diminish to the fluting in proportion to the feed of the cross member; the amount of the tilting may be adjusted by crank pin 34.

Turning now to the invention forming the subject matter of this application, means are provided for preliminarily setting up a section of a column preparatory to placing it upon the turntable. This enables one section to be made ready for fluting or finishing while another section is being ground or cut. The parts are shown in Figure 2, in position after the column has been set up and placed vertically upon the turntable. The work "W" is clamped between two supporting frames 41, 42, connected by tie rods 43, the frames being clamped tight upon the work by nuts 44. A derrick (not shown) then lifts the clamping frames and work over and upon the turntable 50, the lifting hook of the derrick engaging holes 45, in sleeve 46, attached to the lower ribbed frame 47. The carrier plate 25, is provided with a pivot king bolt 48, fixedly secured to it, the bolt being provided with an extension 49, by which turntable 50, is held down to its seat on carrier 25, by lock nuts 51. A centering cone 52, may be clamped to turntable 50 by screws 53. As the derrick lowers the work holder with the central opening in frame 41, over the centering cone 52, which it frictionally fits, the cone will center the work holder. When finally lowered in place, pin 54, on the turntable passing thru an opening in frame 41, registers the work holder in place on the turntable and transmits the rotary motion of turntable 50, to the work holder 41.

Means are provided for clamping and unclamping the holder upon the turntable and for preventing the tipping of the turntable while work is being fluted. As illustrated, see Figure 2, the sleeve 46, is secured upon the top of the central portions of the ribs of the lower frame 41. A clamping bolt 55, is dropped down upon the threaded end of center extension rod 49, the flanges 56, guiding the bolt upon the rod. A washer 57, and nut 58, transmit clamping pressure after the bolt 55, has been screwed upon rod 49. This clamps the workholder down upon the turntable and clamps the turntable securing it from tipping due to pressure of the grinding tool, when fluting the column. When it is desired to rotate the turntable, nut 58, is unscrewed and the hand wheel 59, is used to turn the table thru the desired arc.

By means of a geared turntable and hand operated means, the work may be turned a predetermined amount. The turntable 50, carrying the work "W", has an annular gear 60, and is rotatably supported on the carrier plate 25, carried by the reciprocating table. The hand wheel 59, secured to shaft 61, carries a pinion, not shown, which engages gear 62, on intermediate shaft 63. Shaft 63, is mounted in standards 64, supported from the carrier plate 25, and carries a gear, not shown, which meshes with gear 65. Gear 65 is secured to intermediate shaft 66, also carried by standard 64, and engages annular gear 60. On turning the hand wheel a definite number of times, the column is turned thru the arc between two flutes.

As shown in Figure 1, the grinder or cutting head shaft 67 is preferably driven by a motor 68, directly mounted on the shaft. Shaft 67 is pivoted and may be swung on its pivot by means of a worm gear segment 69, carried by the grinder shaft support, the said worm being driven by hand wheel 70. This hand wheel when turned will turn the worm and swivel the grinder shaft, grinder and driving motor about their common pivoted connection with carriage 11. Shaft 71 may be turned by power from motor 68 by belt pulleys 72, 73 and belt 74, and countershaft 75, carrying a bevel gear 76 with which may engage either gear 77 or 78. These last two gears are splined to shaft 71 and will rotate the shaft in one of two opposite directions when brought respectively into contact with driving gear 76. This will turn the grinder shaft by power about its pivot. In Figure 1, two grinding heads 79, 80, are shown, the head 79, having a conical flange grinding portion 81 for finishing the flat separating ribs of the columns between flutes and a cutting portion for cutting a groove between the flutes. Head 79, gives a preliminary cut to the flutes.

Having thus described the invention, its operation will be clear. The column or work is first clamped between the frames 41, 42 and then is hoisted above and upon the turntable 50. It is clamped in place by tightening screw 55. The work of grinding may then proceed. It will be understood that changes may be made in carrying the invention into effect without departing from the principle thereof.

What I claim is:

1. In a machine for grinding stone, the combination of a reciprocating table, a rotary work supporting table carried thereby, a removable pair of frames for preliminarily clamping the work and means for clamping the clamping frames to the rotary work supporting table, the work being supported vertically.

2. In a machine for grinding stone, the combination of a reciprocating table member, a rotary work supporting table carried thereby, a removable pair of frames for preliminarily clamping the work means for clamping the clamping frames to the rotary work supporting table and to the reciprocating table member and means for rotating the work supporting table after unclamping the latter clamping means from the reciprocating table member.

3. In a machine for grinding stone, the combination of a reciprocating table, a rotary work supporting table carried thereby, a removable pair of frames for preliminarily clamping the work, means for clamping the clamping frames to the rotary work supporting table and a registering pin for registering and connecting the work clamping frames with the rotary work supporting table.

4. In a machine for grinding stone, the combination of a reciprocating table, a rotary work supporting table carried thereby, a removable upper and lower frame for preliminarily clamping the work, the lower frame having a central opening, a fixed central pivot about which the rotary table may be rotated and a centering device in axial alignment with the pivot and cooperating with the central opening in the lower clamping frame.

5. In a machine for grinding stone, the combination of a reciprocating table, a rotary work supporting table carried thereby, an upper and a lower frame for preliminarily clamping the work, the lower frame having a central opening, a fixed central pivot about which the rotary table may be rotated, a centering device in axial alignment with the pivot and cooperating with the central opening in the lower clamping frame, and means for clamping the clamping frames to the rotary work supporting table.

6. In a machine for grinding stone, the combination of a reciprocating table, a rotary work supporting table carried thereby, an upper and a lower frame for preliminarily clamping the work, the lower frame having a central opening, a fixed central pivot about which the rotary table may be rotated, said pivot provided with an extension rod, and means for clamping the frames to the table, comprising a sleeve and clamping bolt, the latter fitting the end of the extension rod.

In testimony whereof, I have signed my name to this specification.

JULIUS WEGNER.